April 16, 1940.　　　　S. H. DOUGLASS　　　　2,197,034
LUNCH BOX
Filed Feb. 14, 1938　　　2 Sheets-Sheet 1

INVENTOR.
SAMUEL H. DOUGLASS.
BY
ATTORNEY.

April 16, 1940.  S. H. DOUGLASS  2,197,034
LUNCH BOX
Filed Feb. 14, 1938  2 Sheets-Sheet 2
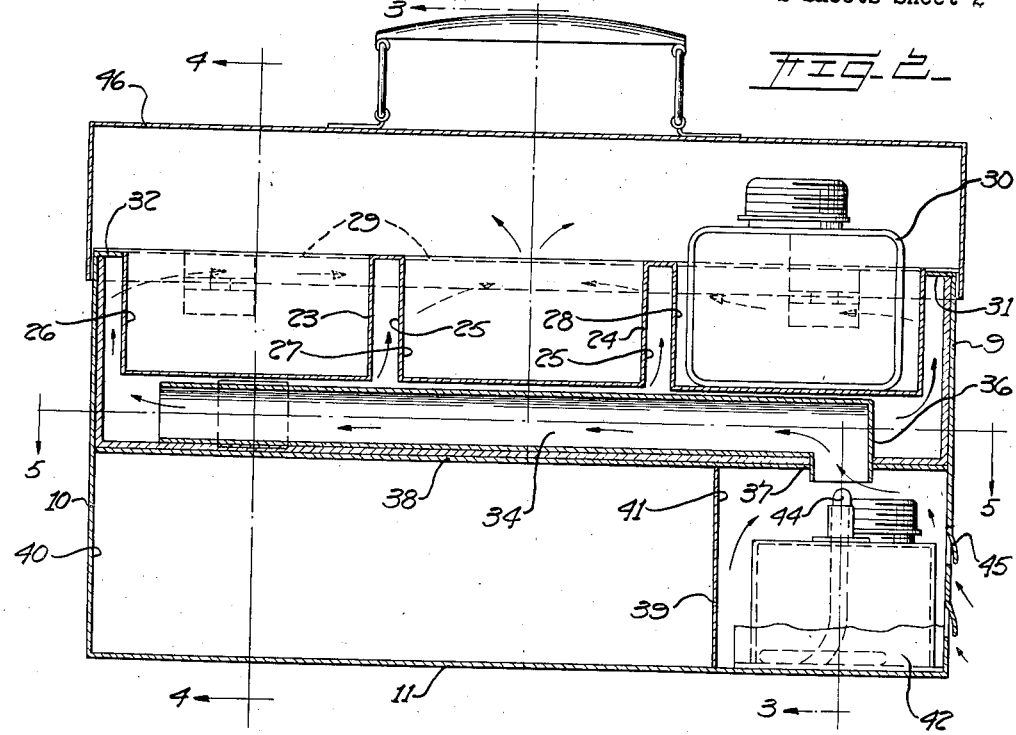
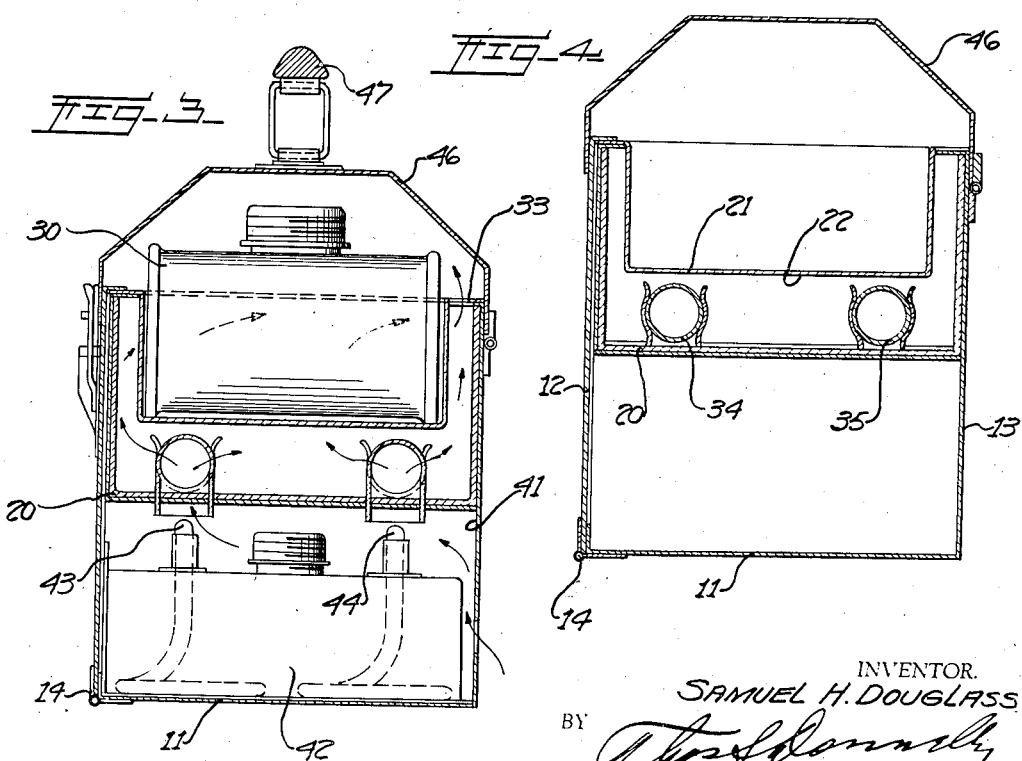
INVENTOR.
SAMUEL H. DOUGLASS
BY
ATTORNEY.

Patented Apr. 16, 1940

2,197,034

UNITED STATES PATENT OFFICE 2,197,034

LUNCH BOX

Samuel H. Douglass, Detroit, Mich.

Application February 14, 1938, Serial No. 190,351

6 Claims. (Cl. 126—266)

My invention relates to a new and useful improvement in a lunch box and has for its object the provision of a lunch box having means incorporated therein for heating the contents thereof.

Another object of the invention is the provision of a lunch box having a pair of flues positioned therein adapted for receiving hot gasses from burners and conducting the same through a compartment in the lunch box for heating the contents thereof which are positioned in an adjacent compartment.

Another object of the invention is the provision in a lunch box of this class of flues for conducting hot gasses into a compartment therein and a construction whereby a circulation of the heated gasses throughout the various spaces surrounding the food containing compartments may be effected.

Other objects will appear hereinafter.

The invention consists in the combination and arrangement of parts hereinafter described and claimed.

The invention will be best understood by a reference to the accompanying drawings which form a part of this specification, and in which, Fig. 1 is a perspective view of the invention showing it in open position.

Fig. 2 is a longitudinal, vertical, central, sectional view of the invention.

Fig. 3 is a sectional view taken on line 3—3 of Fig. 2.

Fig. 4 is a sectional view taken on line 4—4 of Fig. 2.

Figure 1:
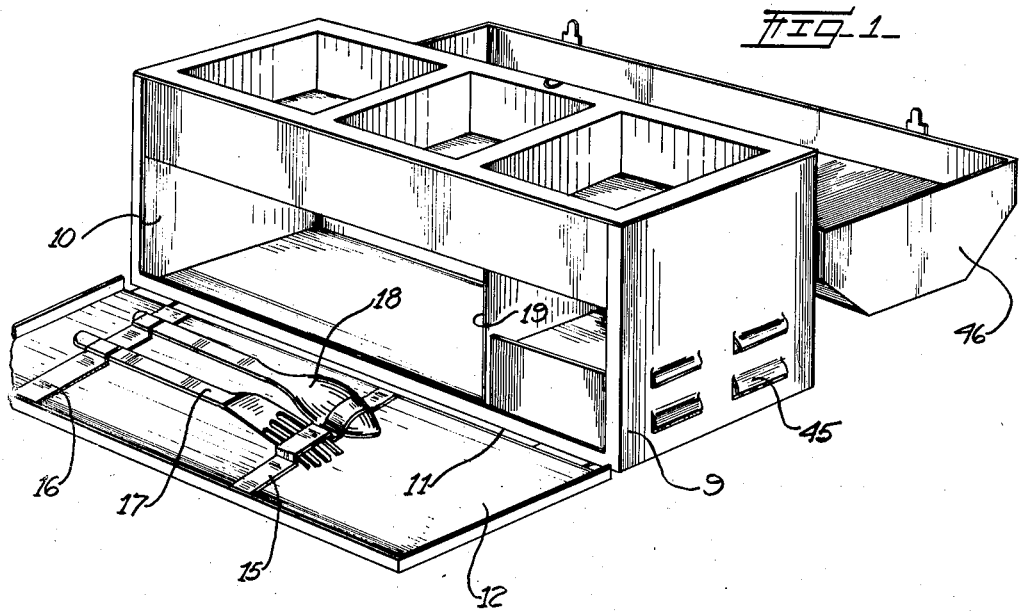
Figure 5:
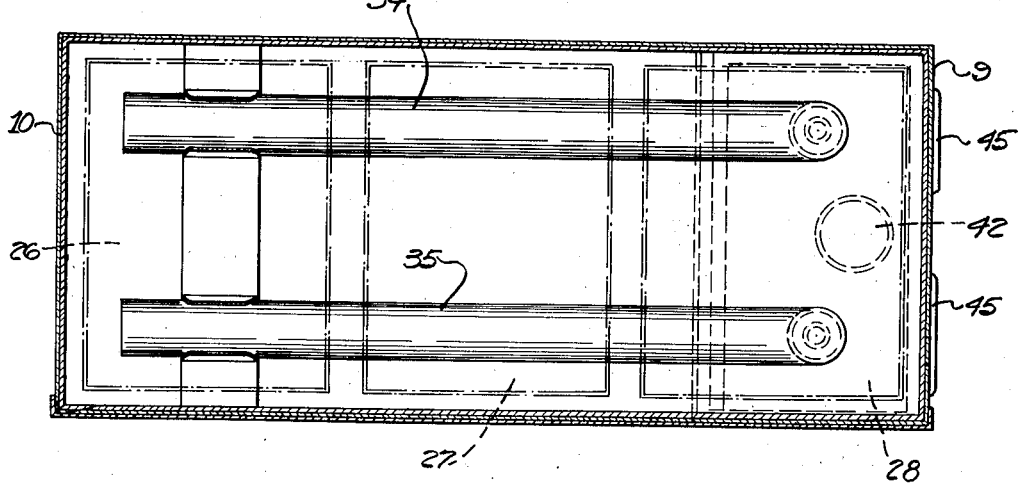
Fig. 5 is a sectional view taken on line 5—5 of Fig. 2.

As shown in the drawings, the invention comprises a box-like structure having end walls 9 and 10, a bottom wall 11, a front wall 12 and a rear wall 13. The front wall is hingedly mounted at its lower edge by means of the hinge 14 so that it may be swung into closed position as shown in Fig. 3, or swung downwardly into open position as shown in Fig. 1 to serve as a tray upon which the food may be placed after it is removed from the lunch box. Clips 15 and 16 serve as a means for retaining the fork 17 and the spoon 18 in position. Mounted in this box-like structure is a supporting body which is double walled. This supporting body is of a box-like structure and the outer casing 20 is spaced from the inner casing 21 to provide space 22 therebetween, this space surrounding the inner casing 21. This inner casing is doubled upon itself to provide the partitions 23 and 24, there being a space 25 between the walls or doubled-over portion of these partitions. The partitions serve to provide the supporting compartments 26, 27 and 28. In the compartments 26 and 27 are mounted the trays or food containers 29 and in the compartment 28 is mounted the liquid container 30. It is believed obvious that the food may be deposited directly in the compartments instead of separate containers which may be inserted in the compartment. The rear wall 13 as well as the end walls 9 and 10 are each provided with the inwardly projecting flange 31 upon which engages an outwardly pressed flange 32 formed on the supporting body so that the compartment forming supporting body may be welded or otherwise suitably secured with these flanges in engagement with each other. Formed through these flanges so as to communicate with the space 22, is a vent opening 33.

Positioned in the bottom of the space 22 is a pair of pipes 34 and 35 each of which is provided with the angularly turned, downwardly projected end portion 36 projecting through an opening 37 formed in the bottom 38 of the double walled supporting body.

A transversely extending partition 39 serves, through its engagement with the bottom 11, to assist in supporting the longitudinally directed partition 38. This partition 39 divides the space below the partition 38 and above the bottom 11 into a pair of compartments 40 and 41. The compartment 40 may be used for the reception of food which it is not intended to be heated, the food intended to be heated, being placed in the trays 29. Positioned in the compartment 41 is a reservoir 42 adapted for the reception of combustible liquids such as kerosene, alcohol or the like. This reservoir 42 is provided with a pair of wicks 43 and 44 each of which registers with one of the downwardly directed portions 36. Formed in the end wall 9 are vent openings or slots 45 to permit passage of air into the compartment 41.

Hingedly connected to the rear wall 13 is a cover 46 provided with a handle 47.

In use, the lunch box may be used in the conventional manner excepting that cooked foods which are more palatable when served hot or warm, may be deposited in the trays 29 and the container 30 may be provided with a beverage customarily served warm. Deposited in the compartment 40 may be such articles of food as would not require heating. Shortly before it is desired to consume the contents of the lunch box, the wicks 43 and 44 may be ignited. The flame from the wicks entering the downwardly turned portions 36. Air will be drawn inwardly through the slots 45 to travel in the directions indicated by the arrows in Fig. 2 so as to enter the pipes 34 and 35. This heated air after traveling through the pipes will pass into the compartment 22 and thus serve to surround the compartments 26, 27 and 28 so as to heat the contents thereof. The vent opening 33 will permit escape of the air into the cover 46 which will not be formed air tight, thus permitting a free flow of this heated air through the chamber 22. It will be noted that by having the partitions doubled upon themselves and spaced apart, this heated air may more effectively serve to heat the contents of the compartments 26, 27 and 28.

In this way I have provided a simple and effective means for heating the contents of a lunch box without in any manner altering the ordinary appearance of the lunch box.

While I have illustrated and described the preferred form of construction I do not wish to limit myself to the precise details of structure shown but desire to avail myself of such variations and modifications as may come within the scope of the appended claims.

What I claim as new is:

1. A lunch box of the class described, comprising: a box-like structure; a double walled supporting body mounted in said box-like structure, one of said walls being provided with a plurality of compartments separated by hollow partitions, there being an air space between said walls; a pair of tubes extending longitudinally of said space and opening at one end thereinto and extending at the outer end through said supporting structure and opening to the exterior thereof; and heating means for inducing a current of heated air to flow through said tubes and discharge inwardly of said space, said supporting structure having a vent opening formed therein communicating with said space.

2. A lunch box of the class described, comprising: a box-like structure; a compartment bearing supporting member mounted in said structure, said supporting member having walls spaced apart to provide an enclosed air space, there being a vent opening formed in said structure for permitting passage of air from said air space, said structure having a plurality of compartments formed therein; hollow partitions separating said compartments and communicating with said air space; tubular conduits extending in said air space and opening at one end thereinto and at the opposite end through a wall of said structure to the exterior thereof; and a heating member mounted in said box-like structure for inducing currents of heated air inwardly through said tubes.

3. A lunch box of the class described, comprising: a box-like structure open at its upper end; a closure for said upper end comprising a double walled compartment bearing member, there being an air space between the double walls of said member, said member having a plurality of compartments; partitions for separating said compartments, said partitions being hollow and communicating with said air space; tubular members traversing said air space and opening at one of their ends into said air space and at their other ends outwardly of said compartment bearing member; a heating element mounted in said box-like structure and adapted for inducing a current of heated air to pass into said tubes and discharge therefrom into said air space, said compartment bearing member having a vent opening communicating with said air space.

4. A lunch box of the class described, comprising: a box-like structure open at its upper end; a compartment bearing member for closing said upper end of said structure and having a plurality of compartments, said member being double walled, said walls being spaced apart to provide an air space; hollow partitions for separating the compartments in said member, the space in said partitions communicating with the air space between said walls, said air space having a vent opening formed therein; and a heating element in said box-like structure for heating air and inducing travel of the same into said air space.

5. A lunch box of the class described, comprising: a box-like structure open at its upper end; a compartment bearing member having spaced apart walls to provide an air space surrounding said member, said member having a plurality of compartments; hollow partitions communicating with said air space and separating said compartments; a conduit positioned in said air space and opening at one end thereinto and at its opposite end through said member to the exterior thereof; and a heating element mounted in said structure for heating the air adjacent the opening of said conduit for inducing a draft of the heated air into said structure, said structure having a vent opening communicating with the air space therein.

6. A lunch box of the class described, comprising: a box-like structure; a hollow supporting body mounted in said box-like structure and having oppositely disposed bottom and top walls, side walls, and end walls; a plurality of compartments projecting inwardly of said supporting body from the upper wall thereof and terminating at their bottoms in spaced relation to the bottom of said supporting body and spaced at their sides from the side and end walls of said supporting body and from each other; and a heating member for heating the air in the unoccupied space in said supporting body, there being a vent opening formed in said supporting body for permitting flow of heated air therethrough.

SAMUEL H. DOUGLASS.